US009360389B2

(12) United States Patent
Gardner et al.

(10) Patent No.: US 9,360,389 B2
(45) Date of Patent: Jun. 7, 2016

(54) HIGH PRESSURE FLAT PLATE TRANSDUCER

(71) Applicant: Kulite Semiconductor Products, Inc., Leonia, NJ (US)

(72) Inventors: Robert Gardner, Westwood, NJ (US); Louis DeRosa, Wayne, NJ (US); Leo Geras, Pearl River, NY (US); Dick Martin, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 105 days.

(21) Appl. No.: 14/481,996

(22) Filed: Sep. 10, 2014

(65) Prior Publication Data

US 2015/0260602 A1  Sep. 17, 2015

Related U.S. Application Data

(60) Provisional application No. 61/954,560, filed on Mar. 17, 2014.

(51) Int. Cl.
*G01D 11/24* (2006.01)
*G01L 19/14* (2006.01)

(52) U.S. Cl.
CPC .................................... *G01L 19/14* (2013.01)

(58) Field of Classification Search
CPC ....... G01D 11/24; G01D 11/245; G01L 19/14
USPC .......................................................... 73/431
See application file for complete search history.

(56) References Cited

U.S. PATENT DOCUMENTS

| 4,903,164 A | 2/1990 | Bishop et al. |
| 5,948,988 A * | 9/1999 | Bodin ................. G01L 19/0038 73/706 |
| 2005/0248434 A1* | 11/2005 | Kurtz ................. B23K 15/0053 338/42 |

FOREIGN PATENT DOCUMENTS

| EP | 0735353 A1 | 3/1995 |
| WO | 2015092997 A1 | 6/2015 |

OTHER PUBLICATIONS

United Kingdom Patent Application No. 1504437.3 Search Report Mailed Sep. 2, 2015.

* cited by examiner

*Primary Examiner* — Lisa Caputo
*Assistant Examiner* — Jamel Williams
(74) *Attorney, Agent, or Firm* — Troutman Sanders LLP; James E. Schutz; Mark Lehi Jones

(57) ABSTRACT

This disclosure provides example systems and methods for a high pressure flat plate transducer assembly. A transducer assembly is provided, which includes a transducer, a housing, and a transducer header. The transducer header can include a header front side configured for accepting the transducer and a header back side configured for mating with the housing at an interface between the header back side and the housing. The transducer assembly is configured such that a pressure exerted on the transducer compresses the interface between the header back side and the housing.

19 Claims, 3 Drawing Sheets

HIGH PRESSURE FLAT PLATE TRANSDUCER

RELATED APPLICATIONS

This application claims priority to U.S. Provisional Patent Application Ser. No. 61/954,560, entitled: "High Pressure Flat Plate Transducer Assembly," filed Mar. 17, 2014, the contents of which are incorporated by reference in their entirety as if fully set forth herein.

TECHNICAL FIELD

This disclosure generally relates to transducers and more particularly to a high pressure flat plate transducer assembly.

BACKGROUND

There are many different ways to interface a pressure transducer to a system to be measured. Threads, crush rings, ferules, and O-rings are all ways to connect the transducer and each one has different benefits and drawbacks depending on the conditions of the test. A face seal O-ring is often used on Aircraft systems because it allows for easy connection to the system while maintaining the correct orientation at all times.

FIG. 1 shows a prior art transducer assembly 100 having a face seal O-ring. A flat plate 101 is used to form an O-ring seal. The flat plate 101 may also include an O-ring groove. Further, the O-ring groove may be located on the mating surface. An aperture 102 may be used to bolt the transducer to the test system. A transducer 104 may be mounted onto a header 103. For many systems, this configuration works well. However, when high pressure systems are tested, this configuration may be problematic. Since the header 103 is typically welded onto the back side 106 of a housing, the weld is under tension when pressurized. This can cause failures when the pressure is too high or under cyclic loading over long time periods. Accordingly, there is a need for techniques to allow for a high pressure flat plate transducer assembly. In addition, other desirable features and characteristics of the present disclosure will become apparent from the subsequent detailed description and claims, taken in conjunction with the accompanying figures and the foregoing technical field and background.

BRIEF SUMMARY OF THE DISCLOSURE

Briefly described, embodiments of the present disclosure relate to a high pressure flat plate transducer assembly. Certain example implementations of the disclosed technology include a transducer assembly. The transducer assembly may include a transducer, a housing, and a transducer header. In certain example implementations, the transducer header may include a header front side configured for accepting the transducer, and a header back side configured for mating with the housing at an interface between the header back side and the housing.

Certain example implementations of the transducer assembly may include an interface adapter. The interface adapter can include an adapter front side configured for attaching to a mating surface, an adapter back side configured to accept the transducer header, and a cavity extending from at least a portion of the adapter front side to the adapter back side and configured to communicate a pressure to the transducer. In accordance with an example implementation of the disclosed technology, the transducer assembly is configured such that the pressure compresses the interface between the header back side and the housing.

According to an example implementation of the disclosed technology, another transducer assembly is provided, which includes a transducer, a housing, and a transducer header. The transducer header can include a header front side configured for accepting the transducer and a header back side configured for mating with the housing at an interface between the header back side and the housing. The transducer assembly is configured such that a pressure exerted on the transducer compresses the interface between the header back side and the housing.

Certain example implementations include a method. The method can include attaching a transducer header to a housing. The transducer header includes a header front side configured for accepting a transducer and a header back side configured for mating with the housing at an interface between the header back side and the housing. The interface between the header back side and the housing is configured to compress with a pressure communicated to the transducer. The method includes attaching the transducer to the header front side of the transducer header, and inserting at least a portion of the transducer, transducer header, or housing into a recess of an interface adapter.

BRIEF DESCRIPTION OF THE FIGURES

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

Figure 1:
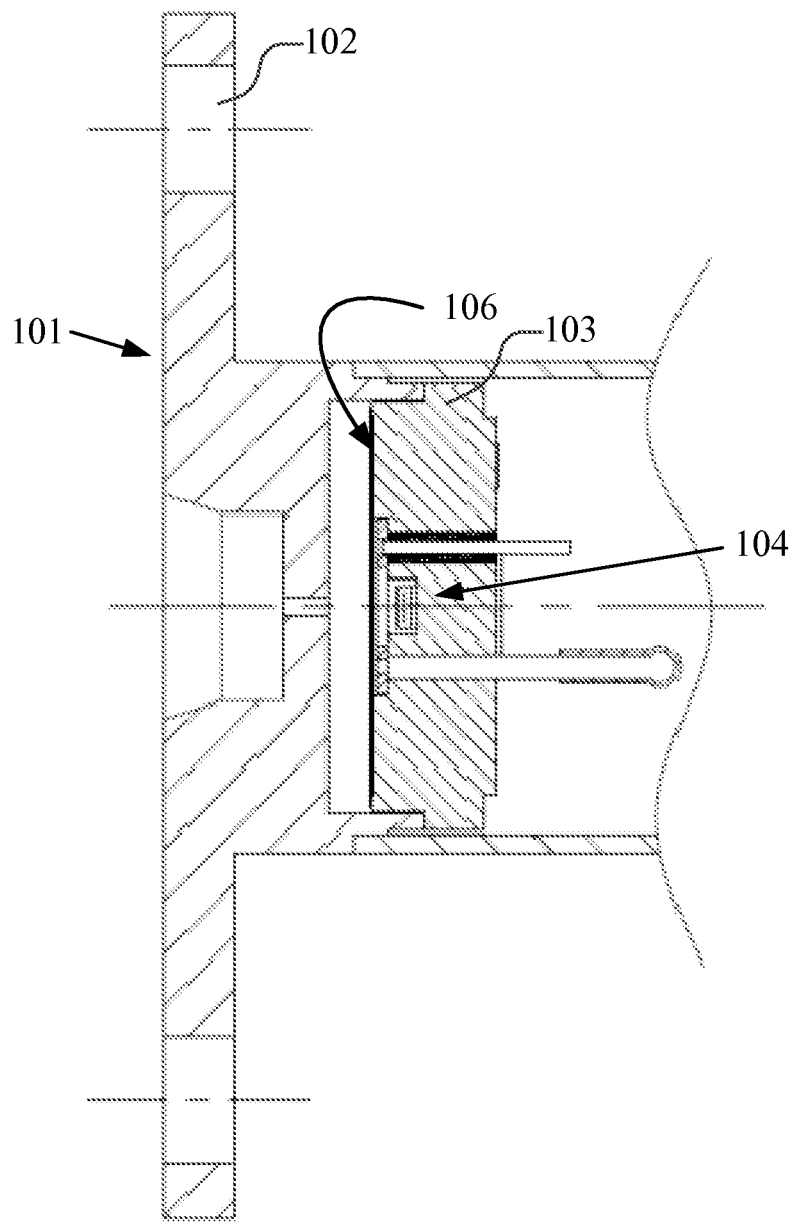
FIG. 1 illustrates a prior art transducer having a face seal O-ring.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a high pressure flat plate transducer assembly. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

The disclosed technology relates to a flat interface pressure transducer assembly arranged such that a header weld in the assembly is in compression during operation to avoid failure at high pressure or after many pressure cycles such as at mid-range pressures.

Figure 2:
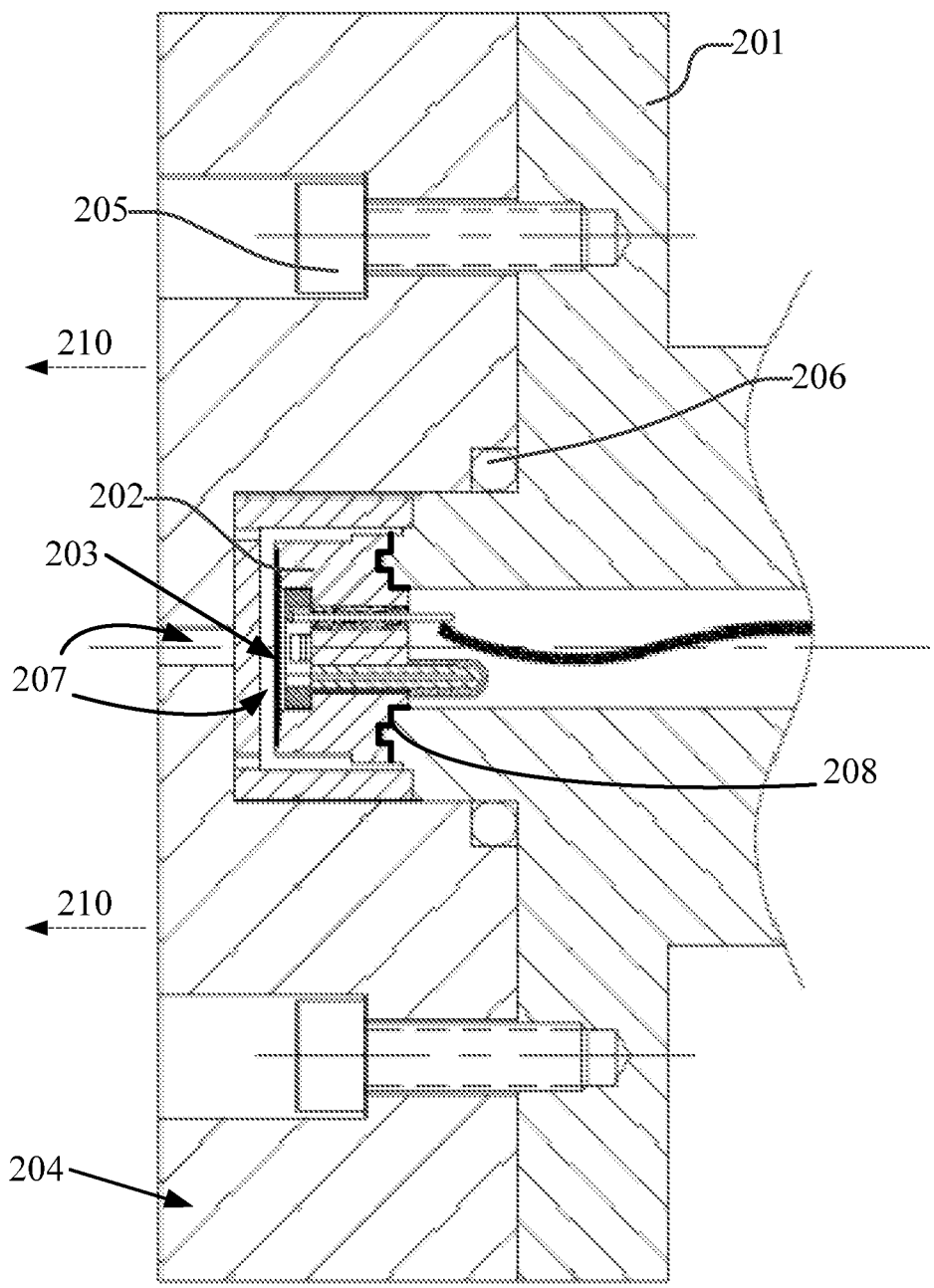
FIG. 2 illustrates one embodiment of a high pressure flat plate transducer assembly 200 in accordance with various aspects set forth herein.

FIG. 2 illustrates an example embodiment of a high-pressure flat plate transducer assembly 200, in accordance with various aspects set forth herein. In an example implementation, the assembly 200 may have an associated front or mating portion (for example, as shown in the left side of FIG. 2) that may be utilized to interface with a mating surface 210 (not shown) via an interface adaptor 204. In certain example implementations, the interface adaptor 204 may be configured with various standard or custom geometries, shapes, sizes, materials, etc. to accommodate various mating test surfaces 210. In this respect, one aspect of the disclosed technology provides a means for accommodating a wide range of mating surfaces 210 (and possible obstructions) by customizing the interface adaptor 204 while the other associated parts (as will be explained below) may be standardized.

According to an example implementation of the disclosed technology, the interface adaptor 204 may include a back portion (for example, opposite the mating portion) that is configured with a recess for accepting one or more of a transducer 203, an associated transducer header 202, and a portion of a housing 201. For example, the transducer 203 may be mounted or attached to the transducer header 202. In an example implementation, the transducer header 202 may be attached to the housing 201 at an interface 208. In an example implementation, the transducer header 202 may be attached and/or secured to the housing 201 with a weld along at least a portion of the interface 208 between the housing 201 and the transducer header 202.

In one example implementation, the interface adaptor 204 may be mounted and/or secured to the housing 201 with a fastener 205 such as a bolt, a screw, a clip, a weld, a press fit or the like. The interface adaptor 204 may be sealed against the housing 201, for example, with a gasket 206 such as an O-ring, a packing, a toric joint or the like. By sealing the interface adaptor 204 to the housing 201, the pressure may enter a cavity 207 and may be transferred to the transducer header 202 and/or the transducer 203 without leaking out.

As indicated in FIG. 2, the arrangement and/or orientation of the transducer 203, the transducer header 202, and the housing 201 enables the interface 208 region to be under compression, for example, when pressure builds up in the cavity 207 and presses the transducer header 202 towards the housing 201. This disclosed feature may provide increased reliability of a weld along at least a portion of the interface 208 between the housing 201 and the transducer header 202.

The disclosed example implementation of the transducer assembly 200 provides a technical benefit being able to sustain higher pressures without failure since the transducer header 202 is configured to be in compression during operation. Another technical benefit of the disclosed configuration of the transducer assembly 200 is that, due to a reduced volume of the cavity 207, the transducer assembly 200 may have an extended high frequency response compared with prior art configurations. Further, another technical benefit of the disclosed transducer assembly 200 includes allowance for different interface adaptors 204 to be mated with the housing 201 providing, for instance, faster or easier installation and/or streamlined production of the various components.

Figure 3:
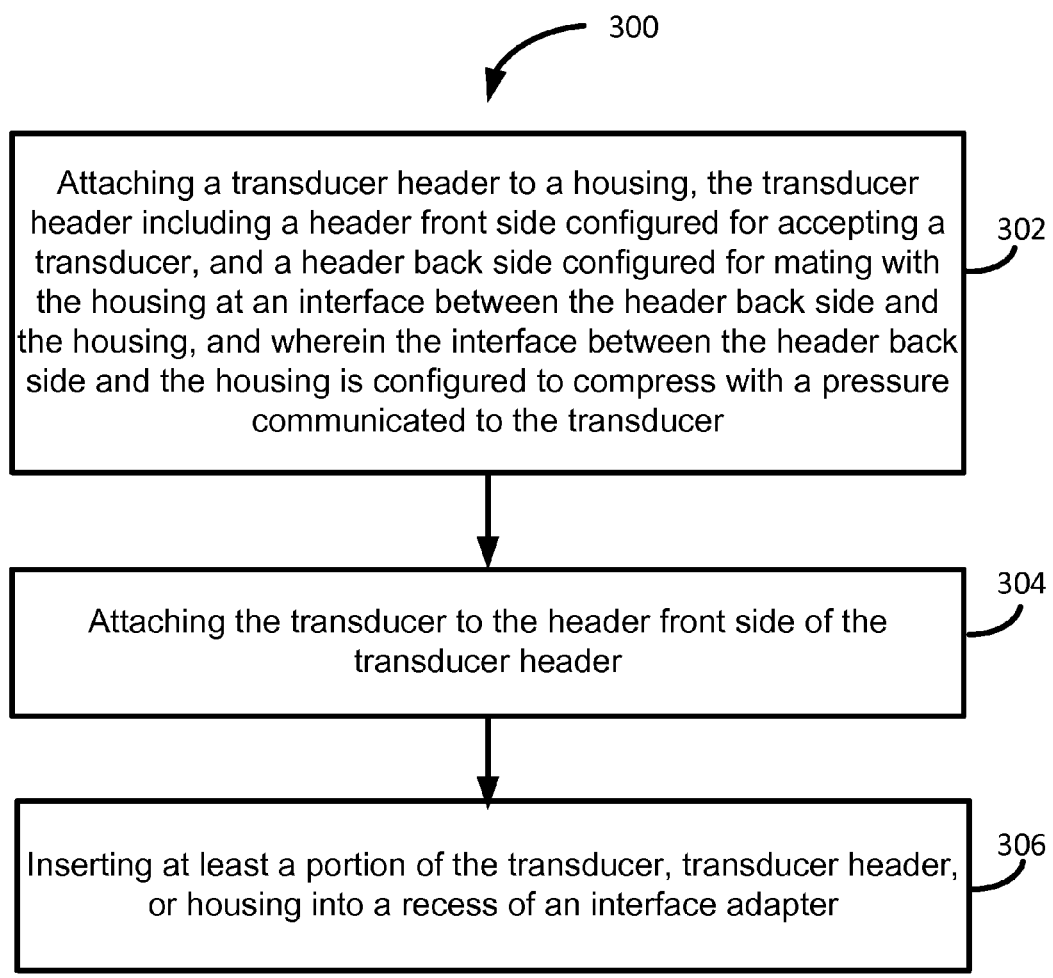
FIG. 3 is a flow-diagram of a method 300, according to an example implementation of the disclosed technology.

FIG. 3 is a flow-diagram of a method 300, according to an example implementation of the disclosed technology. In block 302, the method 300 includes attaching a transducer header to a housing, the transducer header includes a header front side configured for accepting a transducer and a header back side configured for mating with the housing at an interface between the header back side and the housing, the interface between the header back side and the housing is configured to compress with a pressure communicated to the transducer. In block 304, the method 300 includes attaching the transducer to the header front side of the transducer header. In block 306 the method 300 includes inserting at least a portion of the transducer, transducer header, or housing into a recess of an interface adapter.

Certain example implementations of the disclosed technology include transducer assembly 200. The transducer assembly 200 may include a transducer 203, a housing 201, and a transducer header 202. In certain example implementations, the transducer header 202 may include a header front side configured for accepting the transducer 203 and a header back side configured for mating with the housing 201 at an interface 208 between the header back side and the housing 201.

Certain example implementations may also include an interface adapter 204. The interface adapter 204 can include an adapter front side configured for attaching to a mating surface 210, an adapter back side configured to accept the transducer header 202, and a cavity 207 extending from at least a portion of the adapter front side to the adapter back side and configured to communicate a pressure to the transducer 203. In accordance with an example implementation of the disclosed technology, the transducer assembly 200 is configured such that the pressure compresses the interface 208 between the header back side and the housing 201.

According to an example implementation of the disclosed technology, the transducer assembly 200 may include a seal or gasket 206 disposed between the housing 201 and the interface adapter 204. The seal or gasket 206 may be configured to withstand and retain the pressure communicated to the transducer 203 and/or the transducer header 202.

According to an example implementation of the disclosed technology, the interface 208 between the header back side and the housing 201 comprises a weld.

In certain example implementations, the interface adapter 204 may include a recess on the adapter back side. The recess may be configured to accept at least a portion of the transducer header 202.

In certain example implementations, the interface adapter 204 can include a recess on the adapter back side, for example, to accept at least a portion of the housing 201.

According to an example implementation of the disclosed technology, the transducer may configured to measure a pressure. According to an example implementation of the disclosed technology, the interface adapter 204 may be attached to the housing 201 with one or more fasteners 205.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned high pressure flat plate transducer assembly, the skilled artisan will readily recognize that the example methods, devices or systems may be used in other methods, devices or systems and may be configured to correspond to such other example methods, devices or systems as needed. Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

We claim:

1. A transducer assembly, comprising:
   a transducer;
   a housing;
   a transducer header comprising:
     a header front side configured for accepting the transducer; and
     a header back side configured for mating with the housing at an interface between the header back side and the housing;
   an interface adapter comprising:
     an adapter front side configured for attaching to a mating surface;
     an adapter back side configured to accept the transducer header; and
     a cavity extending from at least a portion of the adapter front side to the adapter back side and configured to communicate a pressure to the transducer;
   wherein the transducer assembly is configured such that the pressure compresses the interface between the header back side and the housing.

2. The transducer assembly of claim 1, further comprising a seal or gasket disposed between the housing and the interface adapter.

3. The transducer assembly of claim 2, wherein the seal or gasket is configured to withstand and retain the pressure communicated to the transducer or the transducer header.

4. The transducer assembly of claim 1, wherein the interface between the header back side and the housing comprises a weld.

5. The transducer assembly of claim 1, wherein the interface adapter comprises a recess on the adapter back side, the recess configured to accept at least a portion of the transducer header.

6. The transducer assembly of claim 1, wherein the interface adapter comprises a recess on the adapter back side, the recess configured to accept at least a portion of the housing.

7. The transducer assembly of claim 1, wherein the transducer is a pressure transducer.

8. The transducer assembly of claim 1, wherein the interface adapter is attached to the housing with one or more fasteners.

9. A transducer assembly, comprising:
   a transducer;
   a housing;
   a transducer header, comprising:
     a header front side configured for accepting the transducer; and
     a header back side configured for mating with the housing at an interface between the header back side and the housing;
   wherein the transducer assembly is configured such that a pressure exerted on the transducer compresses the interface between the header back side and the housing.

10. The transducer assembly of claim 9, further comprising an interface adapter, the interface adapter including:
    an adapter front side configured for attaching to a mating surface;
    an adapter back side configured to accept the transducer header; and
    a cavity extending from at least a portion of the adapter front side to the adapter back side and configured to communicate pressure to the transducer.

11. The transducer assembly of claim 9, further comprising a seal or gasket disposed between the housing and the interface adapter.

12. The transducer assembly of claim 1, wherein the interface between the header back side and the housing comprises a weld.

13. The transducer assembly of claim 1, wherein the transducer is a pressure transducer.

14. A method comprising:
    attaching a transducer header to a housing, the transducer header comprising:
      a header front side configured for accepting a transducer; and
      a header back side configured for mating with the housing at an interface between the header back side and the housing;

attaching the transducer to the header front side of the transducer header;

inserting at least a portion of the transducer, transducer header, or housing into a recess of an interface adapter, the interface adapter comprising:

an adapter front side configured for attaching to a mating surface;

an adapter back side comprising the recess, wherein the recess is configured to accept at least the transducer header; and a cavity extending from at least a portion of the adapter front side to the adapter back side and configured to communicate a pressure to the transducer;

wherein the interface between the header back side and the housing is configured to compress with the pressure communicated to the transducer.

15. The method of claim 14, further comprising installing a seal or gasket between the housing and the interface adapter.

16. The method of claim 15, wherein the seal or gasket is configured to withstand and retain the pressure communicated to the transducer or the transducer header.

17. The method of claim 14, further comprising applying a weld in least a portion of the interface between the header back side and the housing to secure the transducer header to the housing.

18. The method of claim 14, wherein the transducer is a pressure transducer.

19. The method of claim 14, further comprising attaching the interface adapter to the housing with one or more fasteners.

* * * * *